Patented Oct. 16, 1951

2,571,136

UNITED STATES PATENT OFFICE 2,571,136

METHOD OF MAKING ICE CREAM

Ralph Horton, Groton, Conn., assignor to National Dairy Products Corporation, New York, N. Y., a corporation of Delaware No Drawing. Application October 28, 1948,
Serial No. 57,126

7 Claims. (Cl. 99—136)

This invention relates to a process of making ice cream.

Ice cream is ordinarily sold in either bulk or packaged form. In the bulk form, the ice cream is usually taken from a large container and packed into pint or quart containers by the soda fountain attendant. In the packaged form, the ice cream in a flowable form is introduced into packages at the factory and the ice cream then hardened; the packages are sold as such by the soda fountain attendant.

In the manufacture of packaged ice cream by usual commercial processes, the ice cream mixture is partially frozen in a mechanical freezer in which the mixture is chilled and agitated; during the chilling an amount of air is finely dispersed into the freezing mixture so that the over-run is 70 to 100%, the latter amount being the maximum used. Generally, this is a continuous process, and the partially frozen mixture exits from the freezer as a soft flowable mass at a temperature of about 20 to 25° F. At this temperature about 40 to 60% of the water content of the mixture is frozen and the sugars and other materials in solution in the remainder of the water content remain in the liquid phase at this temperature. It is not practical to chill the mixture below this temperature during the freezing, because it becomes too viscous and cannot be moved through the freezer.

The ice cream in this condition is put into the boxes or containers and then stored at a low temperature to harden. Generally it is stored at a temperature of about —15 to —25° F. for a day or sometimes longer, during which time the ice cream in the packages will become as much as 85 to 95% frozen. It is possible to harden the packages more rapidly by blowing them with very cold air as they move through a tunnel and in such methods it is possible to harden individual pint packages of ice cream in as little as an hour. This requirement for low temperature hardening rooms, or the use of specially constructed hardening tunnels, requires additional processing of the packages and requires considerable time for their chilling before they are ready to be delivered to the ice cream merchant.

There is a general preference for the bulk type ice cream, which is packed by the soda fountain attendant from a large container. The exact reason is not known, but the bulk ice cream is thought to have a better texture. Ice cream manufacturers have long recognized this preference, however, and have made every effort to make packaged ice cream in such a way that it has the same consumer appeal as the bulk ice cream. All of the variables have been adjusted in an attempt to accomplish this, but without success. For example, the amount of over-run (the proportion of air that is finely distributed in the ice cream during freezing), the amount of milk solids, the amount of butter fat, the amount of sugar, etc., have all been adjusted relative to each other in an unsuccessful attempt to find a formula which produced a packaged ice cream that had the same taste and appeal as bulk ice cream.

In accordance with my invention, I have discovered a process by which packaged ice cream can be manufactured so as to have the desirable properties of bulk ice cream. The ice cream made in accordance with my invention has markedly superior texture and improved flavor.

In accordance with my invention, I have also discovered a method in which the hardening of the ice cream after filling the packages is eliminated, and in which the ice cream made by the process of my invention can be packaged and is ready for immediate delivery.

In accordance with my invention, I produce the ice cream by a combination of three distinct steps: (1) I freeze an ice cream mixture in a conventional type freezer with agitation so as to have an unusually high over-run, i. e., at least 125%; (2) after the ice cream leaves the freezer in the soft, flowable condition, I subject it to a further chilling operation to cool it to a temperature low enough to have a shape-retaining plasticity or hardness; (3) at this latter temperature and in this condition I subject the ice cream to pressure, so as to reduce the over-run to the conventional amount, i. e., 70 to 100%.

In accordance with the first step of my process an ice cream mixture is prepared in which the milk solids, butter fat and sugar are proportioned as desired, since these are not critical in the process. Any proportions conventionally used in ice cream making may be employed.

The mixture is then frozen with an agitator-type of freezer, in either a batch or continuous freezer, preferably the latter, to a temperature of about 20 to 25° F., at which temperature about 40 to 60% of the water content of the mixture is frozen, and the ice cream is in a soft, putty-like flowable condition. It is essential in accordance with the first step of my process that the freezing be done with agitation to form the ice cream into a soft, flowable condition, but which nevertheless, is sufficiently frozen to retain the finely dispersed air particles within the partially frozen ice cream mixture and to prevent them from escaping or agglomerating. The freezing is so carried out as to incorporate an unusually large amount of air into the ice cream in a very finely dispersed condition, to such an extent that the amount of over-run is in the range of 125% to as high as practical. A useful range is 135% to 160%, preferably about 150%. In the latter case 1 cu. ft. of the liquid mixture before freezing occupies 2½ cu. ft. in the partially frozen condition.

It is important in accordance with my process that the freezing step be of a type in which the air is incorporated during agitation to form a soft, flowable mixture, since it is essential that the air be incorporated in the finely dispersed condition which is obtainable by means of agitation during the freezing.

The first step of my process is to be distinguished particularly from such freezing processes as the spraying of liquids upon a refrigerated drum, or the production of ice cream in flake or powder-like form.

In accordance with the second step of my process, the partially frozen ice cream described above is further chilled so as to have a "shape-retaining plasticity," by which I means a sufficient hardness so that it can be compressed under force and retain its compressed shape, and yet not so hard that the ice cream cannot be readily compressed by moderate pressures. As a result of this compressing of the ice cream in shape-retaining condition, it retains its compressed shape and has a lower volume than when initially frozen. Shaped portions of the compressed ice cream may then be wrapped, boxed, or otherwise packaged, and if desired, can be further cooled to the temperature at which ice cream is usually maintained for delivery, or may be stored under any of the usual ice cream storage conditions.

In accordance with a preferred embodiment of the second step of my process of my invention, the ice cream as it exits from the freezer with the abnormally high over-run, but still in the usual soft flowable stage, is immediately spread upon a revolvable drum which is internally refrigerated. It may have a surface temperature, for example, of about −20 to −24° F. The drum, at this temperature, revolves at a rate of about one revolution in each 50 to 70 seconds, preferably about 1 R. P. M. The ice cream is scraped off the drum after being subjected to this temperature for about a minute, by any means which breaks the ice cream into uniformly small-sized pieces without crushing or mashing the ice cream, such as by revolving or stationary knives. The temperature of the surfaces of the pieces which were adjacent the cold surface is lower than that of the surfaces further removed from the refrigerated surface. The particles are permitted to temper for about one-half minute to one-and-a-half minutes, during which time the temperature becomes more or less uniform throughout the mass of each particle.

The temperature to which the ice cream is chilled may vary somewhat, depending upon the precise formula used, and particularly the amount of the over-run, the amount of milk solids, butter fat, sugar, etc., in the ice cream. In general, the temperature will be about −10° to +10° F. The chilled ice cream must be sufficiently hard to retain its shape when compressed and yet must not be so hard as to resist reasonable compressive forces. One skilled in the art of ice cream manufacture will readily understand how to select the precise temperature in view of the explanation herein. The average temperature of the pieces after tempering is −3° F., plus or minus 5°. It will be obvious that the temperature of the refrigerated surface may vary and is related to the time of hardening. If a lower temperature is used, the drum can revolve at a higher speed and vice versa, provided the ice cream can be chilled to have a shape-retaining plasticity within a reasonable time. Apparatus other than a revolving drum can be used to chill the ice cream as will be obvious.

The tempering before compression in the last step is not essential because it will be accomplished during or after the last step, if not before. Furthermore, during the time interval that it takes to move the hardened ice cream from the hardener to the compressing device a certain amount of tempering will take place. The entire hardening operation, including the chilling on the refrigerated surface and the tempering, is carried out in a so-called "zero room" in which the atmosphere is maintained at a temperature of about 0° F. plus or minus by about 5°. The hardening is done at atmospheric pressure so that the volume of the ice cream is not appreciably altered during the hardening. The increased volume (which is reduced in the last step) is obtained in the initial freezing step. This is to be distinguished from the use of a vacuum in the second step for increasing the bulk, which is apt to increase the size of the air cells or rupture them, either of which is undesirable. Any incidental reduction in volume that occurs due to the pressure that is required in my process to spread the ice cream on the chilling rolls is relatively immaterial and unobjectionable.

The chilling of the ice cream from the freezer as described, greatly minimizes the long time required to chill the ice cream after it leaves the freezer, and produces a very fine crystalline structure.

The chilled ice cream in the plastic shape-retaining stage is then subjected to a compressing operation to reduce the volume of the ice cream so that the over-run is in the normal range, i. e., 70 to 100%. This compression to reduce the volume is to be distinguished from mere compacting of the individual frozen pieces without a substantial reduction in a normal over-run obtained in the first step.

It will be apparent from the above description that the minimum amount of compression contemplated would reduce the over-run from 125% to 100%, or a 20% reduction. The maximum would reduce the over-run from 160% to 70%, or a reduction of over 60%. The preferable range is a reduction of 25% to 50%; for instance, an ice cream frozen to an initial over-run of 150% in the first step would be compressed in the last step to have an over-run of 80% and produce an exceptionally high-quality ice cream.

While I do not intend to be bound by any theory which explains the improvement in the ice cream obtained in accordance with the process of my invention, the following observations are offered as a possible explanation. It is believed to be fairly well accepted in the art that the texture and eating qualities of ice cream improves with an increase in the amount of over-run, i. e., an ice cream made from an identical mixture with a high over-run tastes richer, for example, than the same ice cream mixture frozen to a low over-run. However, there is an upper limit to the amount of over-run, due in some instances to legal requirements, and at all events to matters of policy, in order that the food content may be substantial when ice cream is sold on a volume basis. For this reason there is an upper limit to the improvement in texture that can be obtained by increasing the over-run.

In accordance with my invention, an ice cream compressed to half its initial volume during the last step of my process to a final over-run of 75%, has a texture approximating that which an ice cream would have if it had an over-run of 150% in the final product. In further considering the possible reason for this, the following example is given merely to illustrate the principle involved in my explanation. Let it be assumed, for instance, that an ice cream initially frozen in the first step to an over-run of 150% has twice as many finely dispersed air bubbles as an ice cream frozen to an initial over-run of 75% in accordance with a conventional method. After the ice cream initially frozen to an over-run of 150% is compressed to one-half the volume (so as to have an over-run of 75% in the final product), there will be twice as many finely dispersed air bubbles, each having one-half the volume, as in ice cream frozen to an initial over-run of 75% by conventional processes. It is believed that this greater sub-division of an equal total volume of air in the ice cream that is obtained in accordance with my process is responsible for the improvement in texture and eating qualities.

Furthermore, and although flavor is difficult to evaluate because of the highly personal equation involved, there is evidence that my process results in an improvement in the flavor of the ice cream. If so, this can be explained on the basis that an ice cream having the 75% over-run but with twice as many air bubbles (which would result from compressing 150% over-run ice cream to half its volume) presents a larger total area for the surface of all of such bubbles. Thus, there is a greater interface between the liquids and the air in the ice cream, and it is this increase in interface which probably contributes to a large extent to flavor.

The compressing operation which comprises the last step of my process may be accomplished in any of a number of ways. In the preferred embodiment, a layer of the hardened pieces of ice cream is spread upon a moving belt which passes under a compressing roller. Another layer of pieces is placed on top of the first compressed layer, and these passed underneath the second compressing roller, and so on until the layer is built up to the desired thickness. Preferably about four such layers may be employed to build up a block about 2 inches in thickness. This embodiment is preferred because the ice cream in the hardened plastic state presents certain practical difficulties in achieving a uniform compression throughout the mass. Thus, if pieces of hardened ice cream are spread out in a single layer 4 inches thick, and compressed in one operation into a layer 2 inches thick, it is more difficult to achieve a uniform compression throughout the thickness of the layer, particularly at the bottom thereof, than if it is done step-wise.

It will be obvious that other equivalent compression steps may be used and other similar forms of apparatus, such as a piston-type compressor.

It will be understood that the entire compression operation should be carried out in the so-called zero room described above so as to maintain the ice cream in the desired plastic state.

During the compression the ice cream is reduced in volume to the desired extent, and in general the compression would be such that the final volume after compression is such that the ice cream has an over-run in the usual range, i. e., 70 to 100%, preferably 70 to 90%. The exact amount of the compression will be that to obtain a product of the desired improved quality, and will be apparent to one skilled in the art in view of the explanation herein.

The ice cream is compressed preferably in a long, bar-like form of any desired cross-section and is cut into cakes, bricks, or any or other shapes of the desired size. It can be wrapped by hand or by any automatic wrapping machine, and the wrapped portion may be placed in a paper, or cardboard wrapper or box, such as a corrugated paper wrapping or box which has desirable insulating properties.

It will be obvious that other methods and apparatus may be used for carrying out the individual steps, the combination of which comprises my invention, and these may be employed besides those described without departing from the broader aspects of my invention as set forth in the following claims.

I claim:

1. A method of manufacturing ice cream, which comprises partially freezing an ice cream mixture with agitation to a soft, putty-like stage and to incorporate air in a finely dispersed form therein during the agitation so as to have an over-run of at least 125%, chilling said partially frozen mixture to a temperature to harden it to a shape-retaining plasticity, and then compressing said chilled and hardened ice cream having said shape-retaining plasticity so as to have an over-run of not over 100%.

2. A method of manufacturing ice cream, which comprises partially freezing an ice cream mixture with agitation to a soft, putty-like stage and to incorporate air in a finely dispersed form therein during the agitation so as to have an over-run of at least 125%, chilling said partially frozen mixture upon a refrigerated surface to a temperature to harden it to a shape-retaining plasticity, tempering said chilled ice cream, and then compacting and compressing said tempered ice cream having said shape-retaining plasticity so as to have an over-run of not over 100%.

3. A method of manufacturing ice cream to be packaged and sold in individual bricks, which comprises continuously freezing an ice cream mixture with agitation to a partially frozen, soft, putty-like stage and to incorporate air in a finely dispersed form therein during the agitation so as to have an over-run of at least 125%, continuously spreading this partially frozen mixture in a film upon a refrigerated moving surface and chilling the film of ice cream to a temperature to harden it to a shape-retaining plasticity, continuously removing the chilled and hardened ice cream from said surface, then compressing said chilled and hardened ice cream having said shape-retaining plasticity so as to have an over-run of not over 100%, cutting the compressed ice cream into bricks and wrapping same into packages.

4. A method of manufacturing ice cream to be packaged and sold in individual bricks, which comprises continuously freezing an ice cream mixture with agitation to a partially frozen, soft, putty-like stage and to incorporate air in a finely dispersed form therein during the agitation so as to have an over-run of at least 125%, continuously spreading said partially frozen mixture in a film upon a refrigerated moving surface and chilling the film of ice cream to a temperature to harden it to a shape-retaining plasticity, continuously removing the chilled and hardened ice cream from said surface, tempering the chilled and hardened ice cream, continuously compacting and compressing a plurality of layers of said tempered ice cream, one upon the other, while having said shape-retaining plasticity so that the compressed layers have an over-run of not over 100%, cutting the compressed ice cream into bricks and wrapping same into packages.

5. A method of manufacturing ice cream, which comprises partially freezing an ice cream mixture with agitation to a soft, putty-like stage and to incorporate air in a finely dispersed form therein during the agitation so as to have an over-run of 135% to 160%, chilling said partially frozen mixture to a temperature to harden it to a shape-retaining plasticity, and compressing said chilled and hardened ice cream having said shape-retaining plasticity so as to have an over-run of 70% to 100%.

6. A method of manufacturing ice cream, which comprises partially freezing an ice cream mixture with agitation to a soft, putty-like stage and to incorporate air in a finely dispersed form therein during the agitation so as to have an over-run of about 150%, continuously spreading said partially frozen mixture upon a refrigerated moving surface and chilling the film of ice cream to a temperature to harden it to a shape-retaining plasticity, continuously removing the chilled and hardened ice cream from this surface, and compressing said chilled and hardened ice cream having said shape-retaining plasticity so as to have an over-run of about 75% to 90%.

7. A method of manufacturing ice cream to be packaged and sold in individual bricks, which comprises continuously freezing an ice cream mixture with agitation to a partially frozen, soft, putty-like stage and to incorporate air in a finely dispersed form therein during the agitation so as to have an over-run of about 150%, continuously spreading said partially frozen mixture in a film upon a refrigerated moving surface and chilling the film of ice cream to a temperature to harden it to a shape-retaining plasticity, continuously removing the chilled and hardened ice cream from said surface, tempering the chilled and hardened ice cream, continuously compacting and compressing a plurality of layers of said tempered ice cream, one upon the other, while having said shape retaining plasticity so as to have a bar of finished ice cream having an over-run of about 75% to 90%, cutting the compressed ice cream into bricks, and wrapping same into packages.

RALPH HORTON.

REFERENCES CITED

The following references are of record in the file of this patent:

UNITED STATES PATENTS

| Number | Name | Date |
|---|---|---|
| 1,791,774 | Vogt | Feb. 10, 1931 |
| 1,965,617 | Vogt | July 10, 1934 |
| 1,986,589 | Mapes | Jan. 1, 1935 |
| 2,062,277 | Routh | Nov. 24, 1936 |
| 2,211,387 | Routh | Aug. 13, 1940 |